United States Patent
Wager et al.

(10) Patent No.: US 7,151,936 B2
(45) Date of Patent: Dec. 19, 2006

(54) DOWNLINK SCHEDULING USING PARALLEL CODE TREES

(75) Inventors: Stefan Wager, Herzogenrath (DE); Joachim Sachs, Aachen (DE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 10/470,159

(22) PCT Filed: Jan. 8, 2002

(86) PCT No.: PCT/EP02/00109

§ 371 (c)(1), (2), (4) Date: Jul. 24, 2003

(87) PCT Pub. No.: WO02/067463

PCT Pub. Date: Aug. 29, 2002

(65) Prior Publication Data

US 2004/0067756 A1 Apr. 8, 2004

(30) Foreign Application Priority Data

Jan. 25, 2001 (EP) .................. 01101616

(51) Int. Cl.
*H04Q 7/20* (2006.01)
*H04J 11/00* (2006.01)
(52) U.S. Cl. ............... 455/450; 455/452.1; 455/509; 307/208; 307/320; 307/335; 375/130; 375/140
(58) Field of Classification Search .......... 455/456.1, 455/452, 453, 560, 561, 450, 451, 452.1, 455/452.2; 370/338, 329, 465, 335, 336, 370/337, 341, 342, 312, 230, 437, 332, 333, 370/431
See application file for complete search history.

(56) References Cited

U.S. PATENT DOCUMENTS

| | | | | |
|---|---|---|---|---|
| 6,163,524 A * | 12/2000 | Magnusson et al. | ........ | 370/208 |
| 6,233,231 B1 * | 5/2001 | Felix et al. | ................ | 370/335 |
| 6,236,646 B1 * | 5/2001 | Beming et al. | ............ | 370/335 |
| 6,335,922 B1 * | 1/2002 | Tiedemann et al. | ........ | 370/335 |
| 6,339,646 B1 * | 1/2002 | Dahlman et al. | .......... | 380/273 |
| 6,473,619 B1 * | 10/2002 | Kong et al. | ............. | 455/456.1 |

(Continued)

FOREIGN PATENT DOCUMENTS

WO    98/35514 A    8/1998

(Continued)

OTHER PUBLICATIONS

International Preliminary Examination Report mailed Apr. 16, 2003 in corresponding PCT Application No. PCT/EP02/00109.

(Continued)

*Primary Examiner*—Charles N. Appiah
(74) *Attorney, Agent, or Firm*—Nixon & Vanderhye, P.C.

(57) ABSTRACT

The present invention aims at avoiding code limitation in a CDMA cellular mobile communication network without decrease in data transmission quality. This object is achieved through a method of scheduling a transfer of data to at least one user in a cellular mobile communication network where the transfer of data is achieved via downlink channels using codes selected from a plurality of code trees. In a first step of the method a plurality of requests (*) to access downlink channels are received until the beginning of a scheduling time interval. In a second step permissions to access downlink channels ( ) are coordinated according to the assignment of downlink channels to the different code trees (A, B).

20 Claims, 9 Drawing Sheets

U.S. PATENT DOCUMENTS

| | | | |
|---|---|---|---|
| 6,567,387 B1 * | 5/2003 | Dulin et al. | 370/329 |
| 6,584,089 B1 * | 6/2003 | Honkasalo et al. | 370/338 |
| 6,631,125 B1 * | 10/2003 | Longoni et al. | 370/341 |
| 6,693,952 B1 * | 2/2004 | Chuah et al. | 375/140 |
| 6,791,952 B1 * | 9/2004 | Lin et al. | 370/281 |
| 6,876,690 B1 * | 4/2005 | Imbeni et al. | 375/130 |
| 6,987,729 B1 * | 1/2006 | Gopalakrishnan et al. | 370/230 |
| 7,039,092 B1 * | 5/2006 | Cao et al. | 375/140 |
| 2002/0118765 A1 * | 8/2002 | Nangia et al. | 375/260 |
| 2003/0114162 A1 * | 6/2003 | Chheda et al. | 455/447 |
| 2004/0120277 A1 * | 6/2004 | Holur et al. | 370/328 |

FOREIGN PATENT DOCUMENTS

| | | |
|---|---|---|
| WO | 99/13600 A | 3/1999 |
| WO | 00/27052 A | 5/2000 |

OTHER PUBLICATIONS

Haard et al, "The TD-CDMA Based UTRA TDD Mode", IEEE Journal on Selected Areas in Communications, vol. 18, No. 8, Aug. 2000, pp. 1375-1385.

* cited by examiner

DOWNLINK SCHEDULING USING PARALLEL CODE TREES

This application is the U.S. National phase of international application PCT/SE02/00109 filed Jan. 8, 2002 which designates the U.S.

FIELD OF INVENTION

The present invention relates to an efficient downlink scheduling using parallel code trees, and in particular to a method of scheduling a transfer of data to at least one user in a cellular mobile communication network where the transfer of data is achieved via different downlink channels using different code trees and a related apparatus.

BACKGROUND OF INVENTION

On the code division multiple access CDMA air interface radio resources are shared between different users by means of a combination of scrambling codes and channelization codes. In the downlink different code trees are generated by applying different scrambling codes to at least one channelization code tree.

As shown in FIG. 1, to each scrambling code there is related a code tree with a set of channelization codes also referred to as codes in the following that are used to separate different channels in a cell of the CDMA cellular mobile communication network. Typically, these channelization codes are orthogonal variable spreading factor OVSF codes that preserve the orthogonality between different downlink channels at different transmission rates. Particularities with respect to scrambling codes and channelization codes are described in, e.g., 3G TS 25.213 V3.1.1 "Spreading and modulation (FDD)" incorporated herein by reference.

As shown in FIG. 1, for each channelization code there is also defined a related spreading factor. E.g., a speech service of 8 kbps may use a spreading factor of 128 (not shown in FIG. 1) and a 384 kbps packet switched data service may require a much lower spreading factor of 8. Therefore, the higher the required bandwidth for a specific downlink channel the lower the number of available downlink channels. Considering also that common control channels consume part of the available radio resources, the maximum number of users in the mobile cellular communication network further drops to lower values.

Therefore, it is expected that the number of available channelization codes will often be a limiting factor in providing downlink channels in CDMA cellular mobile communication networks, i.e. that code limitation will restrict the access of users to the network.

In other words, these CDMA cellular mobile communication networks will perceive code limitation in particular when there are many packet data users in the system requiring high bandwidth and when additional capacity enhancing techniques are applied, e.g., space-time coding, interference cancellation, and/or adaptive antennas.

However, sometimes it is not the downlink channelization codes that are the limiting factors, but rather the power available for data transmission. Nevertheless, the available power is "soft limited" meaning that a temporary increase of power for data transmission over a certain threshold may be tolerated to a certain extent. On the other hand, channelization codes are "hard limited" meaning that, in case there are not enough codes, data transmission is impossible.

When using one scrambling code and evaluating code limitation against power limitation, it would appear that downlink power limitation only occurs if most channelization codes are used at the same time. However, this assumption is true only when many users are active at the same time. Further, in real life—in particular due to the burstiness of packet data connections—channelization codes will be allocated although they are not used. Therefore, this approach leads to a situation where the system is code limited while the maximum power limit is not reached. Nevertheless, new users may not access downlink channels in the CDMA cellular mobile communication network.

A first approach known from the state of the art to overcome this problem is code management. By using radio resource control signaling the downlink channelization codes are constantly assigned and re-assigned between users in the cells according to their activity. However, this requires an immense radio resource control signaling further increasing the load in a cell of the mobile communication cellular network. Further, resource allocation is slow and requires a time larger than the round trip time on the radio link, i.e. a code allocation through radio resource control takes approximately 500 ms. However, this is too slow especially for high data rate end users.

A second approach known from the state of the art is the use of a downlink shared channel DSCH. Here, several users share the same channelization code assigned to the downlink shared channel and resources are assigned in a time multiplexed manner. While the radio resource control signaling load compared to the previous code management approach is reduced, code management is still needed to adapt the capacity of the downlink shared channel to the load imposed by several users. Also, a soft handover is not possible on this downlink shared channel and an associated downlink channel is needed for each single user equipment terminal for the control signaling.

Yet another approach according to the prior art is the use of multiple scrambling codes, i.e. the use of multiple code trees. This approach enables the assignment of several scrambling codes to downlink channels to solve the code limitation outlined above and therefore allows for a reduced radio resource control signaling load compared to the code management approach. A major drawback of the use of multiple code trees is, however, that it causes a large increase in interference due to loss of orthogonality of used channelization codes. In other words, channelization codes of different code trees are not orthogonal with respect to each other and therefore the interference level in the cell of the mobile cellular communication network increases.

BRIEF SUMMARY

In view of the above, the object of the present invention is to avoid code limitation in a CDMA cellular mobile communication network without decrease in data transmission quality and without increase in interference.

This object is achieved through a method of scheduling a transfer of data to at least one user in a cellular mobile communication network where the transfer of data is achieved via downlink channels using channelization codes selected from a plurality of code trees. In a first step of the method a plurality of requests to access downlink channels are received until the beginning of a scheduling time interval. In a second step permissions to access downlink channels are coordinated according to the assignment of downlink channels to the different code trees.

In other words, there is proposed a method of scheduling a transfer of data using a plurality of code trees for downlink data transmission.

Therefore, by allocating several code trees the necessary code management is minimized as the code tree utilization may remain low in comparison to the use of only a single code tree.

Further, by using scheduling the main drawback involved by the use of several code trees—i.e. loss of orthogonality and increased interference—can be controlled, e.g., eliminated or at least minimized. This is achieved by switching between different code trees. The code resources remain allocated to users even when they are inactive. As long as channelization codes not forming part of the same code tree are only activated mutually in a time-exclusive manner, an otherwise occurring interference may be avoided through the present invention.

Code limitation is overcome in particular when many packet data users are active and during application of capacity enhancing techniques which decrease the interference level, e.g., space-time coding, interference cancellation, adaptive antennas. Further, the present invention may be used to implement a cellular mobile communication system without downlink shared channels.

According to a preferred embodiment of the present invention access permissions for downlink channels are coordinated such that an interference is minimized.

Therefore, the code limitation problem is solved for the downlink data transmission while maximizing orthogonality of simultaneously used downlink channelization codes to reduce downlink interference. Preferably, the scheduling of access permissions is interrupted when a maximum interference level is exceeded.

According to a further preferred embodiment, requests for assignment of codes to downlink channels or requests for scheduling of access permissions are classified into different categories, e.g., into mandatory requests, priority requests, and normal requests and the assignment of codes to downlink channels or the scheduling of access permissions is based on an order mandatory requests, priority requests, and normal requests.

According to this preferred embodiment it is possible to influence the assignment of codes to downlink channels, e.g., such that a certain downlink channel has assigned a code from a certain code tree in a mandatory manner. This allows to support different code administration strategies.

Further, it is possible to increase flexibility for downlink data transmission to a plurality of end users. Mandatory requests must be transferred and cannot be delayed in any way. Further, priority requests may be related to a specific kind of data, e.g., priority data traffic which may be due to a priority subscription or transmission requirements.

According to yet another preferred embodiment, different assignment strategies are provided for the step to assign channelization codes to downlink channels.

A first strategy is to select a channelization code from a code tree with maximum code tree utilization.

The result of this strategy is that the number of different code trees wherefrom simultaneously codes are selected is minimized which is of particular use when minimizing interference between different downlink channels. Only when code limitation is reached the next code tree will be used. Overall, this allows for an easy scheduling and enables the implementation in single code user equipment.

A second strategy is to select channelization codes from code trees with minimum code tree utilization or equivalently to uniformly distribute users between the different code trees so that each available code tree is used as little as possible. While this slightly increases scheduling complexity, it facilitates the channelization code management and enables an implementation in single code user equipment.

A third strategy for channelization code selection is to select channelization codes from different code trees and access the downlink channels in an alternating manner according to the code trees.

Here, depending on the business model one option could be to assign one code tree to business users (premium rate users) to achieve some priority differentiation of users, e.g. based on the price of the subscription. This strategy only requires low scheduling complexity, allows for an easy code management and enables the implementation in single code user equipment.

Also, the method as well applies if a user is grouped to several code trees. Here, grouping may be achieved according to the traffic/radio bearer characteristics, e.g., QoS class. While this increases scheduling complexity it allows for better service differentiation at the cost of a multi-code user equipment implementation.

Similar advantages as outlined above with respect to the method are achieved by an apparatus for scheduling a transfer of data to at least one user in a cellular mobile communication network where the transfer of data is achieved by different downlink channels using codes selected from different code trees.

Therefore, also the apparatus for scheduling of data transfer overcomes downlink code limitation for a CDMA cellular mobile communication network by reducing non-orthogonality of codes selected from multiple code trees and therefore by reducing downlink data transmission interference. It simplifies code management algorithms and reduces the signaling load over the wireless link. Contrary to available downlink shared channels it may be applied in soft handover and is particularly beneficial for packet data traffic to be considered as major type of traffic in 3G mobile cellular communication networks.

Further, resource allocation is fast if inband signaling is used instead of outband signaling. Inband signaling information—e.g., TFCI—is sent on a dedicated physical control channel which indicates whether and in which format data is sent on said or a corresponding physical channel. In this way no associated logical data and no associated logical data channel DCH is needed in the downlink for resource assignment as with the downlink shared channel outlined above.

Yet another decisive advantage as embodied in either the method or apparatus discussed so far is that it may be flexibly adapted to different scenarios, e.g., to hierarchical cell structures and/or hybrid CDMA cellular mobile communication systems cooperating with further mobile telecommunication systems pre-installed, e.g., GSM systems.

The hierarchical cell structures are of particular use in hotspot areas like airports where an additional overlay CDMA carrier may be assigned to, e.g., allow high-speed internet access and download to user equipment. Further, in hybrid systems one mobile communication system, e.g., GSM may be used to support real time connections like voice while the other system CDMA is used for packet data. This allows to protect investments of network operators while simultaneously adapting to new requirements and applications requiring increased bandwidth.

According to another preferred embodiment there is provided a computer program product on a storage medium or directly loadable into the internal memory of a radio access unit in a mobile communication network comprising software code portions for performing the steps according to inventive method when the product is run on a processing system of the radio access unit.

Therefore, the present technology is also provided to achieve an implementation of the method steps on computer or processor systems. In conclusion, such implementation leads to the provision of computer program products for use with a computer system or more specifically a processor comprised in, e.g., a media access unit of a wideband CDMA cellular communication network.

Programs defining the functions can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or internet and/or telephone networks via modems or other interface devices. It should be understood that such media, when carrying processor readable instructions implementing the inventive concept represent alternate embodiments.

BRIEF DESCRIPTION OF DRAWING

In the following, preferred embodiments of the present invention as well as further objects, features and advantages thereof will be explained with reference to the enclosed drawing in which.

DETAILED DESCRIPTION

Figure 1:
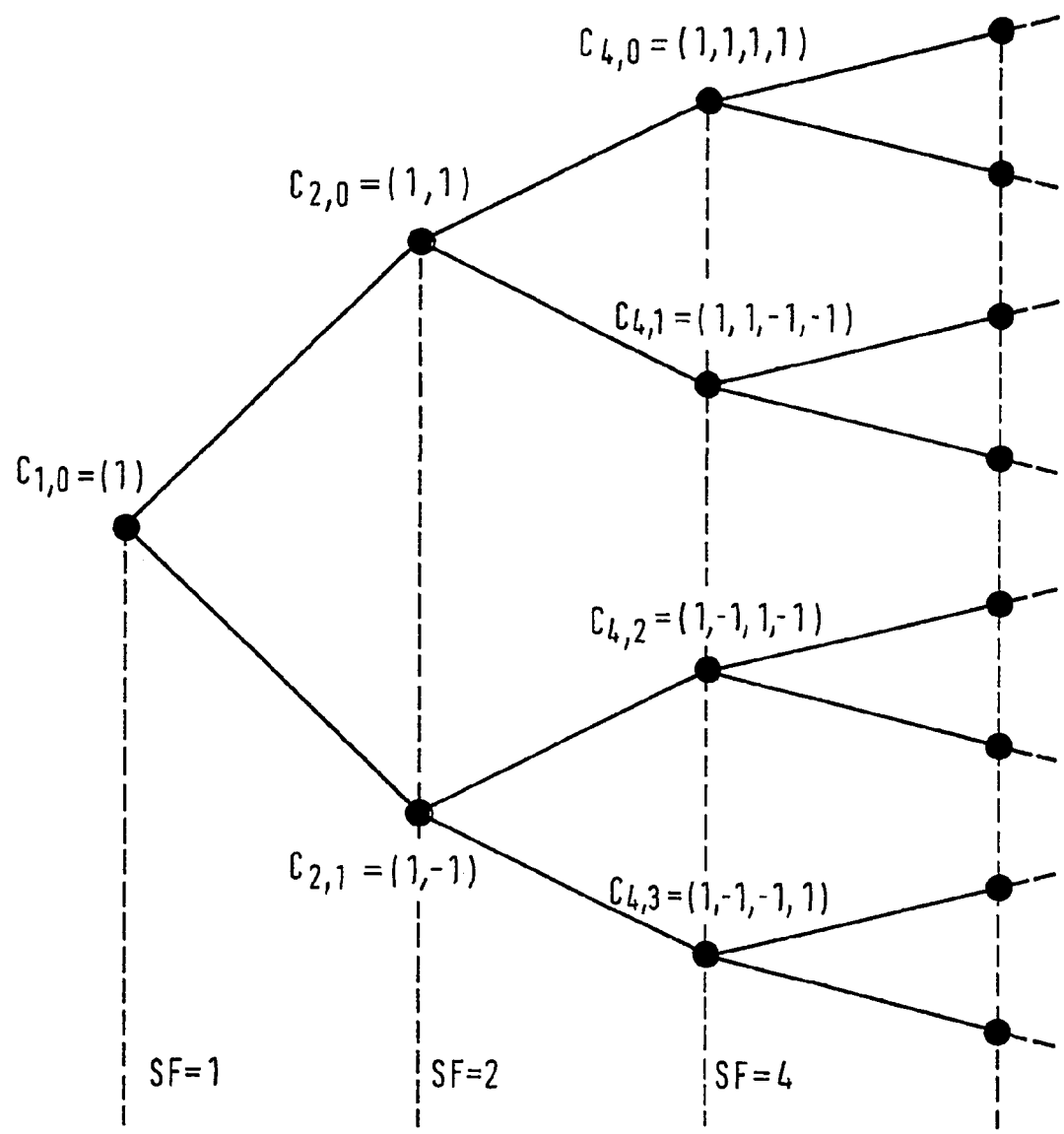
FIG. 1 shows channelization codes from a code tree.

In the following, the best mode as well as several preferred embodiments thereof will be described with respect to the drawing. Insofar as different functional units are shown in the figures, it should be noted that each such unit may either be implemented in software and/or hardware and/or a combination thereof. Further, it should be noted that the different features as explained with respect to the different embodiments may as well be combined insofar as not stated otherwise in the following.

Figure 2:
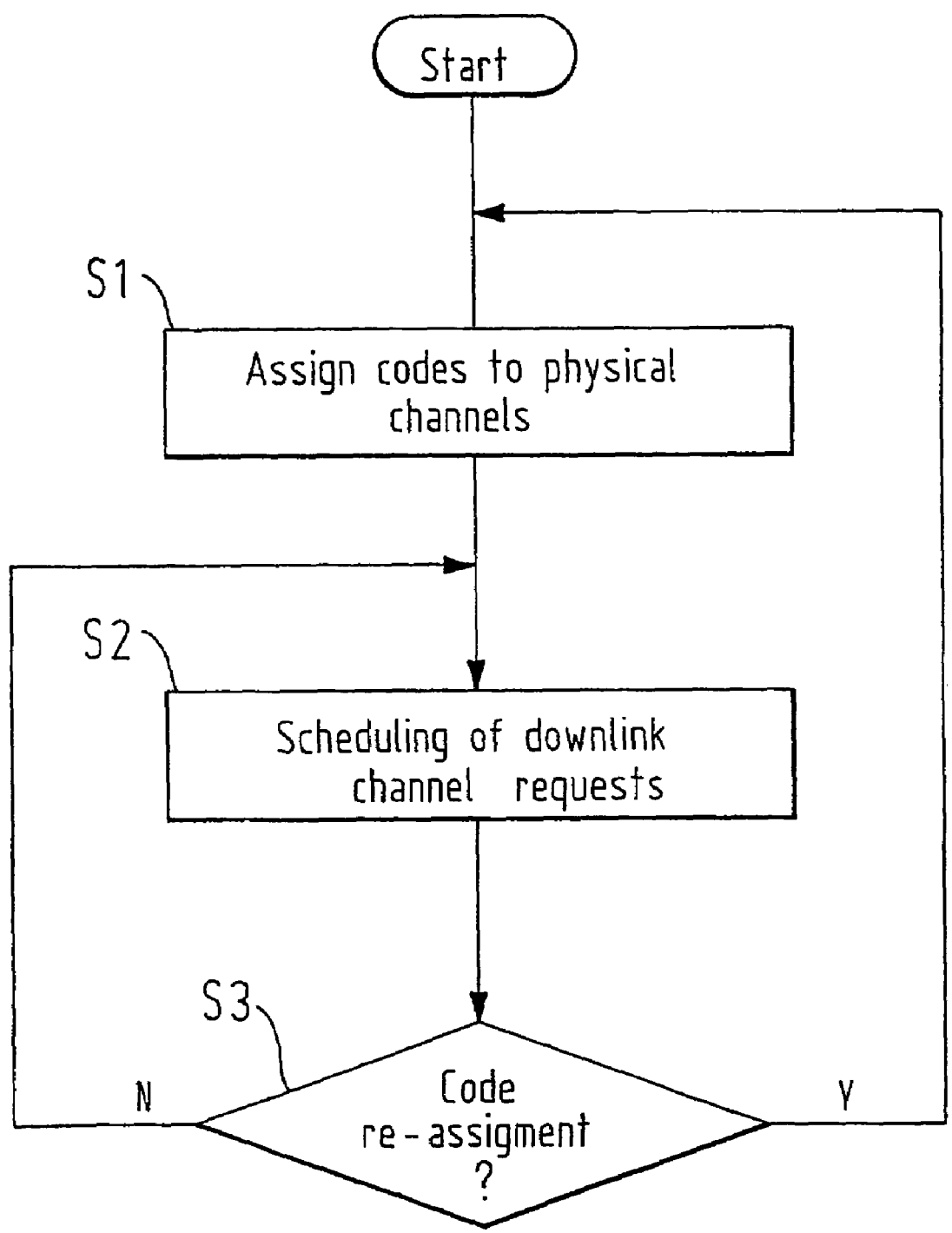
FIG. 2 shows a flowchart illustrating the assignment of codes and the subsequent scheduling for data transfer.

FIG. 2 shows a flowchart illustrating the relationship between assignment of channelization codes and the subsequent scheduling of requests for data transfer. As shown in FIG. 2, initially codes are assigned to different downlink channels or users in step S1. The result of this step S1 is that each downlink physical channel uses a certain channelization code selected from a code tree which is identified by a related scrambling code SC.

As also shown in FIG. 2, the assignment of codes to downlink physical channels is time variant, e.g., changes due to start or end of a connection or due to subscribers roaming into or out of a cell of the mobile cellular communication network or due to a change of the data type to be transferred, e.g., from voice to data or vice versa. For this reason, there is carried out the interrogation step S3 subsequent to the scheduling for downlink data transfer in step S2. If no code re-assignment is necessary, the scheduling of downlink data transfer is continued while otherwise the procedure branches back to step S1 for a revision of the assignment of codes to downlink physical channels. Assigning codes to logical channels is equivalent to performing an assignment of codes for physical channels and the mapping of physical to logical channels accordingly.

Further details will now be explained with reference to FIG. 3 which shows an example for the distribution of requests for data transfer over time and users.

Figure 3:
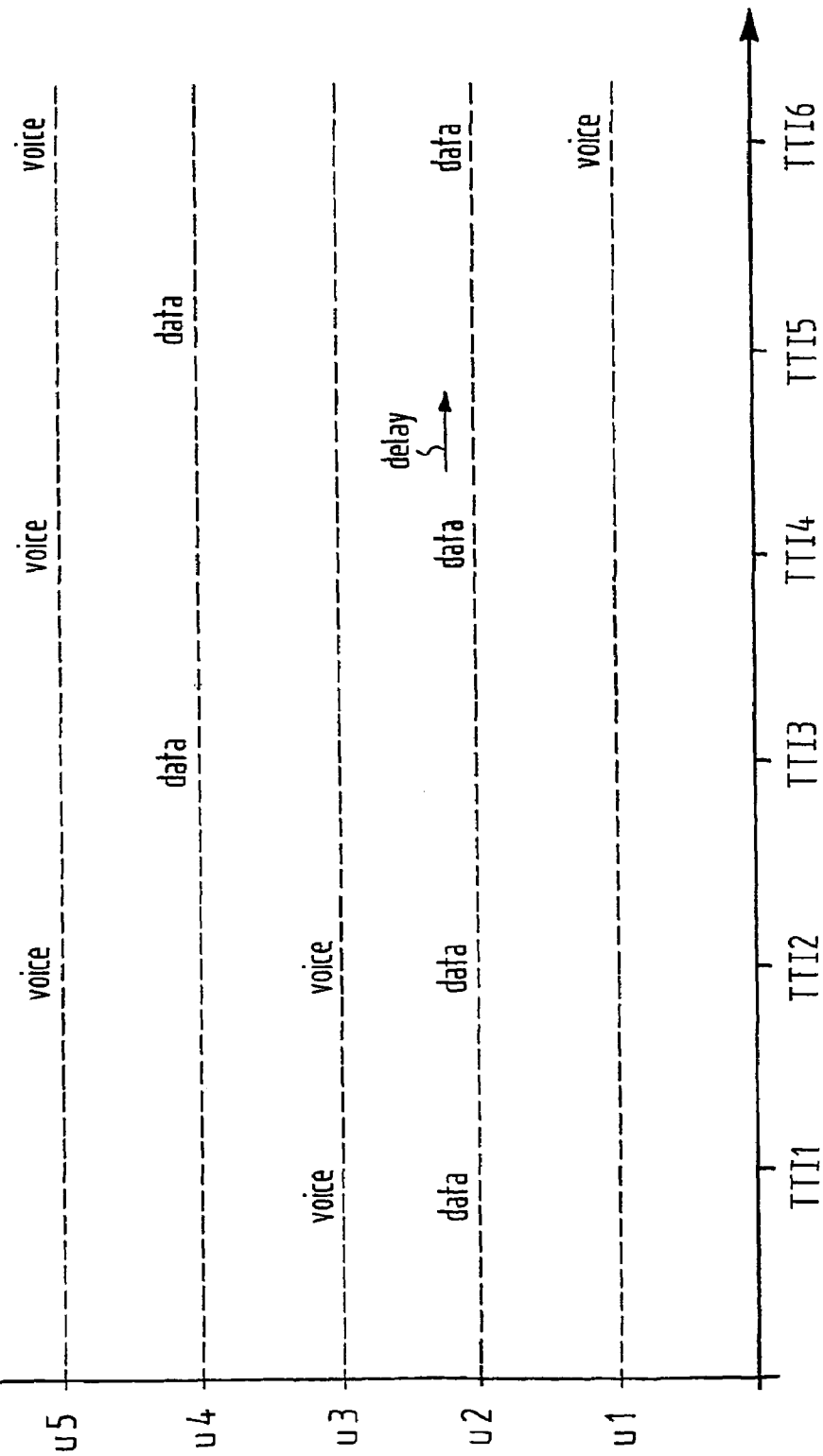
FIG. 3 shows an example for the distribution of requests for data transfer over time and users.

As shown in FIG. 3, there may exist a plurality of users u1, . . . , u5 requesting downlink data transfer for different types of data, e.g., voice and/or data. Also, the related requests for data transfer vary over time. The scheduling according to the present invention may be achieved on a transmission time interval TTI basis, which is much faster than radio resource control signaling. TTI values of different length are possible, especially a value being the multiple of a unit length.

In the most general sense scheduling techology implies the consideration of requests for data transfer until the beginning of each transmission time interval TTI.

For each request there is already selected a code from a code tree. According to the techology scheduling criteria like interference are evaluated to determine which request will lead to a permission to access a specific downlink channel.

If a pre-specified interference level is exceeded it is proposed to delay the transfer of data on a downlink channel to a subsequent transmission time interval. Considering the aims of supporting data packet transfer this does not construe a particular problem if no real time requirements exist for packet data transfer or if these requirements are not exceeded.

In the following the scheduling of data transfer via different downlink channels using codes from different code trees will be explained in more detail.

Figure 4:
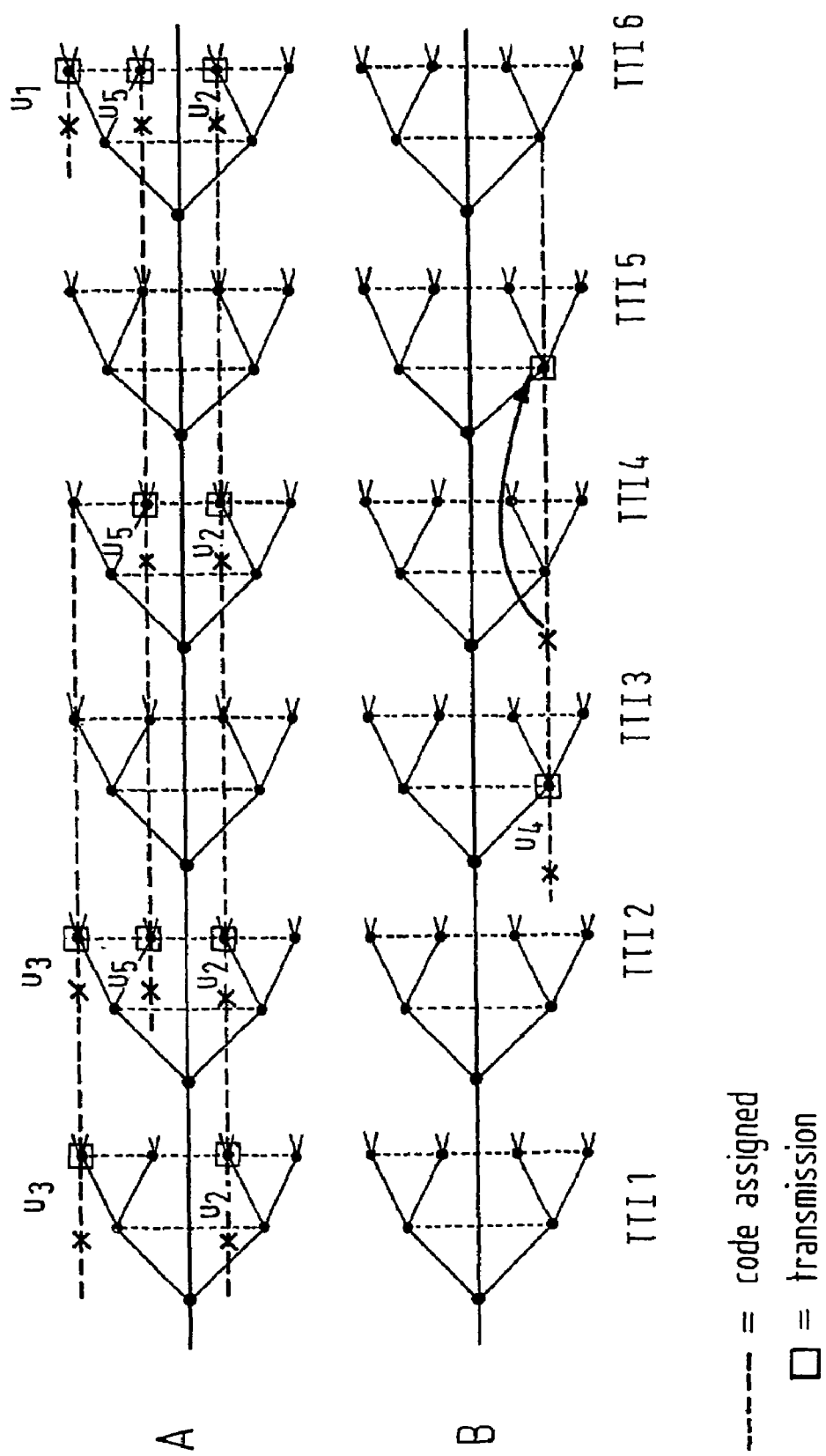
FIG. 4 shows an explanation of the scheduling method according to a first embodiment.

FIG. 4 shows an explanation of a scheduling method according to a first embodiment. The dashed line in FIG. 4 illustrates the maintenance of a code assignment over a plurality of transmission time intervals TTIi. Rectangles illustrate transmission of data using specific codes previously assigned. Requests for data transfer are illustrated by asterisks.

As shown in FIG. 4, the transfer of data is achieved via downlink physical channels using codes selected from different code trees A and B. Requests (*) to access downlink channels are received until the beginning of transmission time intervals, e.g., for the user u1 before TTI6, for the user u2 before TTI1, TTI2, TTI4 and TTI6, for the user u3 before TTI1 and TTI2, for the user u4 before TTI3 and TTI4, and for the user u5 before TTI2, TTI4, and TTI6.

The access to downlink channels is scheduled considering the assignment of codes from different code trees to the downlink channels or users.

As shown in FIG. 4, for the first two transmission time intervals TTI1, TTI2 there does not arise any code limitation or interference problem as codes required for data transfer are selected from the first code tree A only.

Further, at the subsequent transmission time interval TTI3 only a request for data transfer is to be handled for the user u4 using a code from code tree B. While the use of only a single code tree would require code management the use of an additional code tree B makes a modification of the code assignment for code tree A obsolete.

Still further, as only the request submitted by user u4 must be scheduled at transmission time interval TTI3, the user u4 may transmit data using the code from code tree B without any interference or impact on data transfer quality.

As shown in FIG. 4, the situation is different at transmission time interval TTI4. Up to the transmission time interval TTI4 requests for data transmission are received from users u2, u4, and u5 using codes of different code trees A and B. To minimize interference, at transmission time interval TTI4 data transmission is scheduled only for users u2 and u5 using codes from code tree A. The data transmission for user u4 is scheduled for the subsequent transmission time interval—or in other words, delayed by one transmission time interval as illustrated by an arrow in FIG. 4—to avoid interference and a decrease of data transmission quality. Finally, the assignment of user u3 to code tree A ends at the transmission time interval TTI4, e.g., due to call termination or to roaming out of the related cell in the cellular mobile communication network.

At the subsequent transmission time intervals TTI5 and TTI6 the same principles as outlined above apply. At TTI5, the delayed data transmission for user u4 is scheduled. At transmission time interval TTI6 data transmission is scheduled for codes of the code tree A and for the newly assigned user u1, and further the users u2 and u5.

Overall, the embodiment shown in FIG. 4 allows to minimize the number of simultaneously used code trees and to maintain a code assignment as long as possible for minimization of the required signaling load in the mobile cellular communication network. By using several code trees code management is minimized.

Further, by using scheduling the main drawback involved by the use of several code trees—i.e. loss of orthogonality and increased interference—can be controlled, e.g., eliminated or at least minimized. As shown in FIG. 4, this is achieved by switching between different code trees and a slightly delayed handling of data transfer requests in case of interference. The code resources remain allocated to users even when they are inactive. As long as codes not forming part of the same code trees are activated mutually in a time-exclusive manner, an otherwise occurring interference may be avoided.

Figure 5:
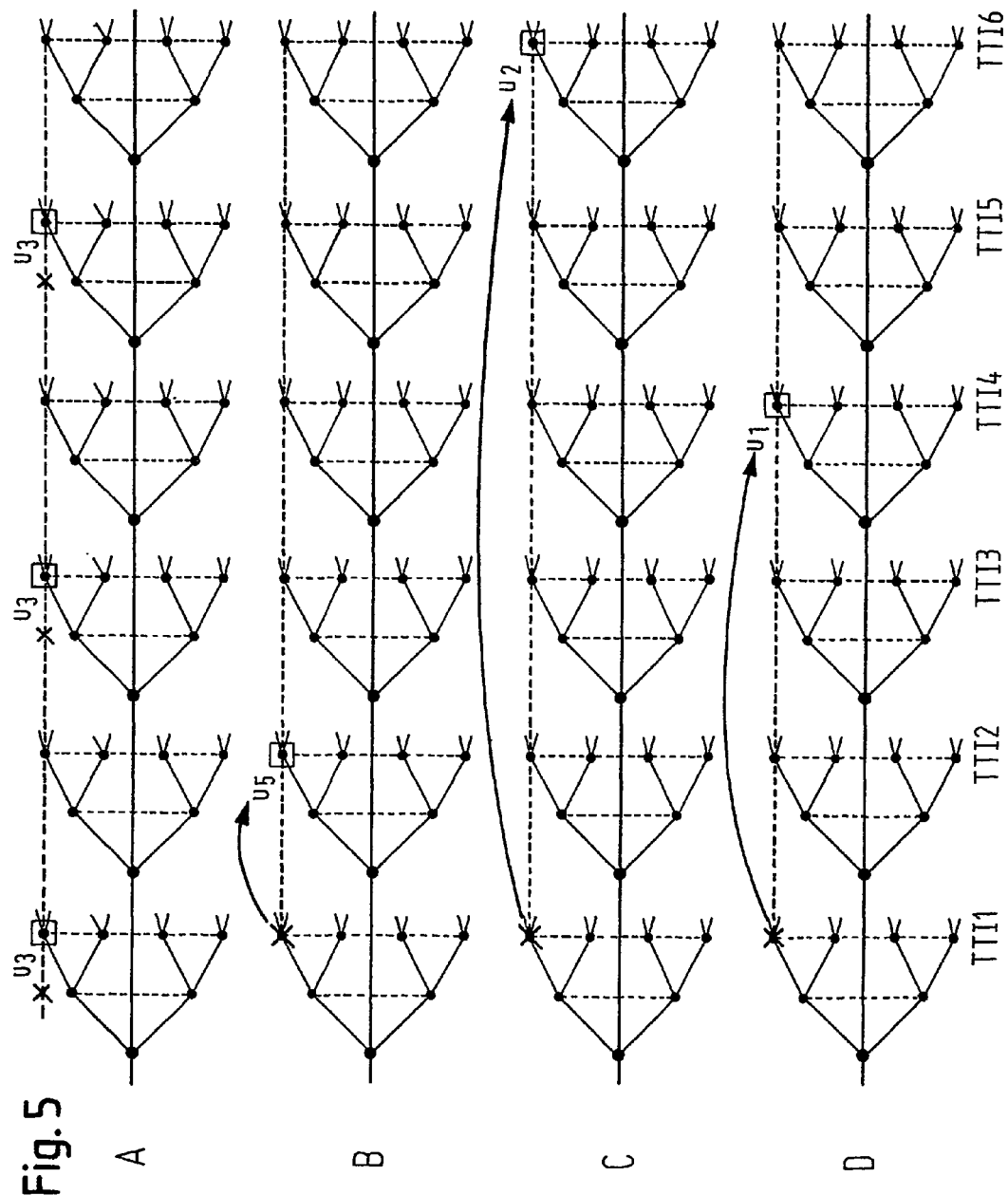
FIG. 5 shows an explanation of a scheduling method according to a second embodiment.

FIG. 5 shows an explanation of a scheduling method according to a second embodiment. Here, similar symbols and signs are used to illustrate the same aspects and will therefore not be explained again.

As shown in FIG. 5, the second embodiment differs over the previous embodiment shown in FIG. 4 in that the number of used code trees A, B, C, and D is increased. This allows to further reduce the necessary code management to a minimum extent. Without restricting the scope and only for the purpose of explanation it may be assumed that user u3 uses a code of code tree A, that user u5 uses a code of code tree B, that user u2 uses a code of code tree C, and that user u1 uses a code of code tree D. Further, it is assumed that user u3 has priority over the other users.

As shown in FIG. 5, before or at transmission time interval TTI1 requests for data transmission are received from all users u1, u2, u3, and u5. However, to avoid any interference data transmission is scheduled only for the prioritized user u3. Subsequent hereto, at transmission time interval TTI2 data transmission is scheduled, e.g., for user u5 according to the request submitted at the previous transmission time interval TTI1.

As also shown in FIG. 5, a further request for data transmission is again received for user u3 having priority before transmission time interval TTI3 and a related data transfer is scheduled immediately. This leads to a further delay of handling the pending data transfer requests of users u1 and u2. For this reason, data transfer for user u1 is scheduled at transmission time interval TTI4. The data transfer for user u2 is scheduled for transfer time interval TTI6 only after the handling of a further data transfer request submitted by user u3 before the transmission time interval TTI5.

Figure 6:
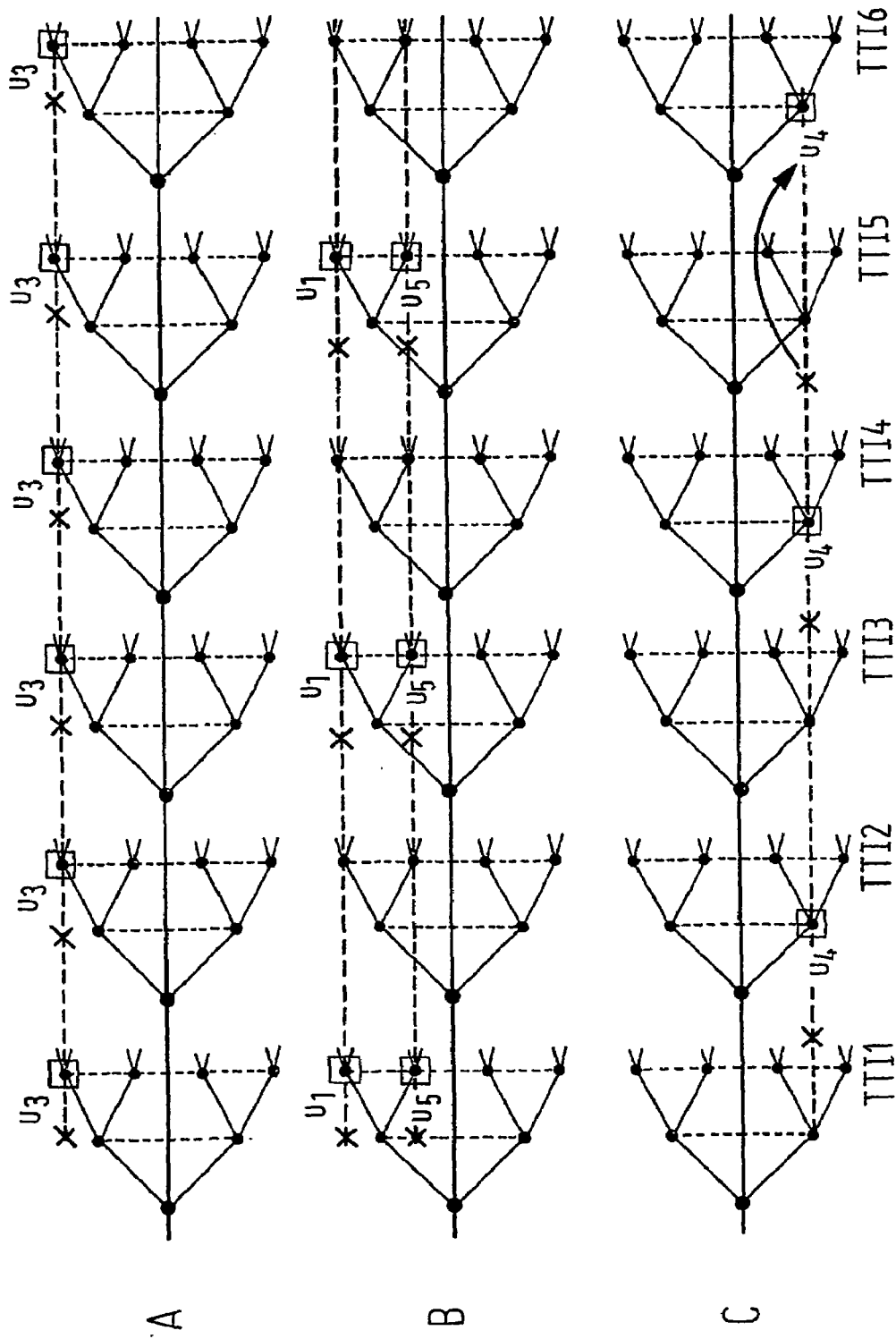
FIG. 6 shows an explanation of a scheduling method according to a third embodiment of the present invention.

FIG. 6 shows an explanation of a third embodiment of the scheduling method.

For the scenario shown in FIG. 6 it is assumed that the user u3 must be scheduled at each transmission time interval TTI1 to TTI6—i.e. his requests are mandatory—and that the downlink data transfer for user u3 leads only to a small amount of interference.

Further, additional users u1, u5, and u4 submit requests for data transfer and are permanently assigned to either code trees B or C.

As shown in FIG. 6, to avoid a too strong increase in interference level, e.g., users u1 and u5 may be assigned to code tree B and user u4 may be assigned to code tree C. Then, users u1 and u5 as well as the user u4 may transfer data along the downlink channel in an alternating manner during the transmission time interval TTI1, TTI3, TTI5 and TTI2, TTI4, TTI6, respectively. Therefore, the scheduling of a data transfer request submitted by user u4 before the transmission time interval TTI5 is delayed to the transmission time interval TTI6.

It should be noted that the different embodiments outlined are only considered as examples the implementation and that the specific scheduling discussed so far should not be considered as restricting. Further modifications and variations for the assignment of different users to codes selected from different code trees may easily be derived from the above given examples, e.g., through a combination thereof. Therefore, in a more general form the present invention is expressed in the following according to a more abstract notation.

In particular, the first step shown in FIG. 2—i.e. the code assignment step—may be summarized as follows:

procedure code_assignment( )
  Assign user(s) to available codes according to one of the following strategies or any combination thereof:
    Select code from code tree with maximum code tree utilization, i.e. minimize number of used code trees;
    Select code from code tree with minimum code tree utilization, i.e. maximize number of used code trees;
    Use different codes according to kind of traffic, e.g., a first (group of) code tree(s) for voice and a second (group of) code tree(s) for data;
    Select different code for alternating permission to access related downlink channel;
    Select codes according to a given classification of requests for code assignment to downlink channels into mandatory requests, priority requests, and normal requests;
    Random selection;
end procedure For further explanation, it is assumed that that each downlink channel may be characterized by certain attributes.

One such attribute could be that the transfer of data traffic via a specific data channel should not be delayed or in other words that a channel must be scheduled, e.g., real time voice traffic. Another attribute could be that a downlink channel has priority assigned to, e.g., best effort data traffic.

Further, those downlink channels being neither in the group of downlink channels that must be scheduled nor in the group of prioritized channels will be referred to as normal channels. From this classification of different downlink channels at the beginning of each transmission time interval the set of downlink channels to be scheduled may be classified as follows:

| | |
|---|---|
| $C(t)$: = | Set of channels/channelization codes at time t that can be scheduled; |
| $Cf(t)$: = | Set of channels/channelization codes at time T that must be scheduled; and |
| $Cp(t)$: = | Set of channels/channelization codes at time T that should be scheduled with priority. |

Further, in the following reference will be made to the term "cross-interference" $I(t)$ for a set of downlink channels scheduled at time t. The cross-interference $I(t)$ is defined as the sum over the mutual interference of those channels which are scheduled at time t:

| | |
|---|---|
| $I(t) =$ | $\Sigma i \Sigma j \{I_{ij}(t) \mid$ channel i is scheduled at time t and channel j is scheduled at time t$\}$. |

One example for the determination of such an interference level will be explained in the following.

One may assume that three codes CC1, CC2, CC3 are available from a first code tree, that four codes CC4 to CC7 are available from a second code tree, and that two codes CC8 and CC9 are available from a third code tree. Further, one may assume that code CC1 is selected from the first code tree, that code CC5 is selected from the second code tree and that code CC9 is selected from the third code tree.

To determine the cross-interference it is necessary to sum up the related mutual interference values I15, I19, I51, I59, I91, and I95. Each specific element in the interference matrix may be considered as degradation of the quality of data transfer on one channel through activation of data transfer on the other data channel. From this, it becomes clear that the block matrices of dimension 3, 4 and 2 along the diagonal line of the interference matrix all comprise 0 elements since all codes of a single code tree are mutually orthogonal.

| | CC1 | CC2 | CC3 | CC4 | CC5 | CC6 | CC7 | CC8 | CC9 |
|---|---|---|---|---|---|---|---|---|---|
| CC1 | 0 | 0 | 0 | I14 | I15 | I16 | I17 | I18 | I19 |
| CC2 | 0 | 0 | 0 | I24 | I25 | I26 | I27 | I28 | I29 |
| CC3 | 0 | 0 | 0 | I34 | I35 | I36 | I37 | I38 | I39 |
| CC4 | I41 | I42 | I43 | 0 | 0 | 0 | 0 | I48 | I48 |
| CC5 | I51 | I52 | I53 | 0 | 0 | 0 | 0 | I58 | I59 |
| CC6 | I61 | I62 | I63 | 0 | 0 | 0 | 0 | I68 | I69 |
| CC7 | I71 | I72 | I73 | 0 | 0 | 0 | 0 | I78 | I79 |
| CC8 | I81 | I82 | I83 | I84 | I85 | I86 | I87 | 0 | 0 |
| CC9 | I91 | I92 | I93 | I94 | I95 | I96 | I97 | 0 | 0 |

Figure 7:
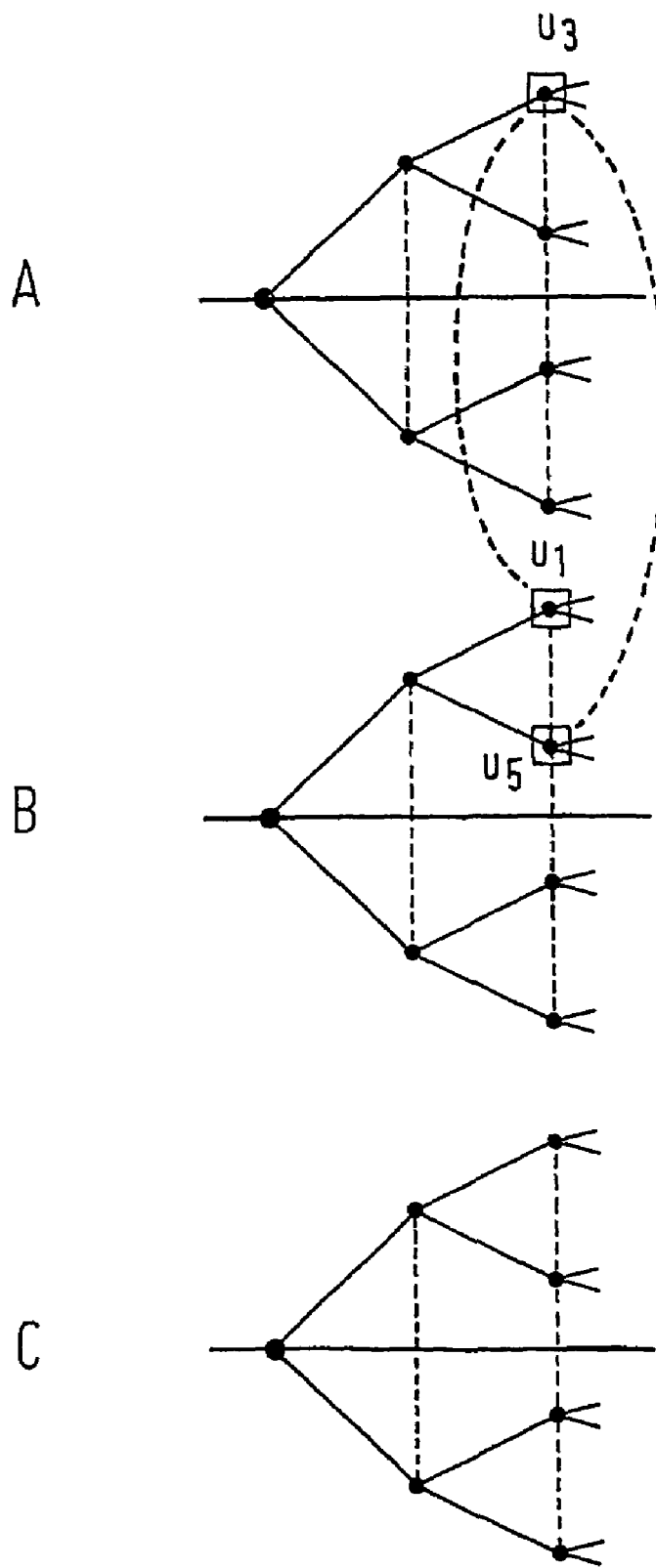
FIG. 7 shows the determination of an interference level according to active users and assigned codes selected from different code trees.

FIG. 7 shows the determination of an interference level according to active users and assigned codes for the embodiment shown in FIG. 6 and the transmission time intervals TTI1, TTI3, TTI5, respectively.

At these transmission time intervals interference has to be considered between the code selected from code tree A and assigned to user u3 and the codes assigned to users u1 and u5 and selected code tree B. It should be noted that these specific interferences may be calculated and/or measured and/or simulated previous prior to the operation of the method and therefore do not lead to an increase of computation time for the scheduling method.

Yet another term used in the following to explain the inventive scheduling method is the term "code utilization for a code tree with scrambling code SC at time t".

Intuitively, the code tree utilization for a code tree increases with the number of codes selected from this code tree for data transfer.

As shown in FIG. 1, this number of selected codes is considered regarding the spreading factor of each code. I.e., the higher the spreading factor of the codes the more codes must be selected to achieve the same code tree utilization in comparison to the selection of codes with lower spreading factors. This is the reason for insertion of the factor $1/SF_i$ into the following equation:

$U(SC,t) = \Sigma i\ 1/SF_i \cdot$(number of all channels having spreading factor $SF_i$ selected from the code tree);

In view of the explanations given so far, the different embodiments and examples for the scheduling of different users to different downlink channels illustrated with respect to FIGS. 4 to 6 may be summarized as follows:

```
procedure schedule_channels( )
    while (no new code(s) assigned)
        /* schedule all channels that must be scheduled,
        e.g., real time voice traffic */
        determine C(TTIi), Cf(TTIi), Cp(TTIi);
        schedule all ci ∈ Cf(TTIi);
        C(TTIi) = C(TTIi)⊖f(TTIi);
        determine I(TTIi);
        /* schedule remaining channels */
        while (C(TTIi) ≠∅ ∧Interference I(TTIi)
                        acceptable)
            if (Cp(TTIi)≠∅) /* channels with priority? */
                select next channel ci from Cp(TTIi), e.g.,
                the one with highest priority and/or the one
                leading to a minimum increase of the
                interference level I(TTIi);
            else /* regular channels */
                select next channel ci from C(TTIi), e.g.,
                the one leading to a minimum increase of the
                interference level I(TTIi) and/or the one
                with highest spreading factor;
            endif
            update I(TTIi), C(TTIi), CP(TTIi);
        endwhile
        delay the channels that could not be assigned by TTI;
    endwhile
end procedure
```

As outlined above, scheduling of different channels is repeated for each transmission time interval as long as the code assignment to the plurality of code trees remains unchanged. An amendment of code tree assignment may occur if either a user terminates or initiates a call or, e.g., roams out of a cell or into a different cell of the mobile cellular communication network leading to a modification after handover.

Further, for each transmission time interval initially a classification of the downlink channels into data channels with mandatory data transmission, prioritized data transmission and normal data transmission is carried out. The result of this step is then used to first schedule all data channels with mandatory data transmission, to update the set of remaining data channels for scheduling accordingly and then to determine the resulting interference level after scheduling of all data channels with mandatory data transmission.

What follows next is the scheduling of the remaining data channels until either no more data channels are to be scheduled or, e.g., an acceptable value for interference is exceeded. Whether an interference is acceptable or not, depends not only on the cross-interference for a specific scheduling, but also on a power control status, physical aspects like location of base stations, distribution of terminals in a cell, and/or physical base station measurement values for the power budget.

Further, during the scheduling phase the result of the classification of data channels is used so as to schedule prioritized downlink data channels before regular downlink data channels.

Here, the selection of the next channel from the set of prioritized downlink data channels may be achieved according to the level of priority or the resulting increase in the level of interference. The same criteria may be applied to the scheduling of normal downlink channels.

Typically, those downlink channels that may not be scheduled at a specific transmission time interval—e.g., according to a too strong increase of the interference—may be delayed to the next transmission time interval for subsequent scheduling.

Figure 8:
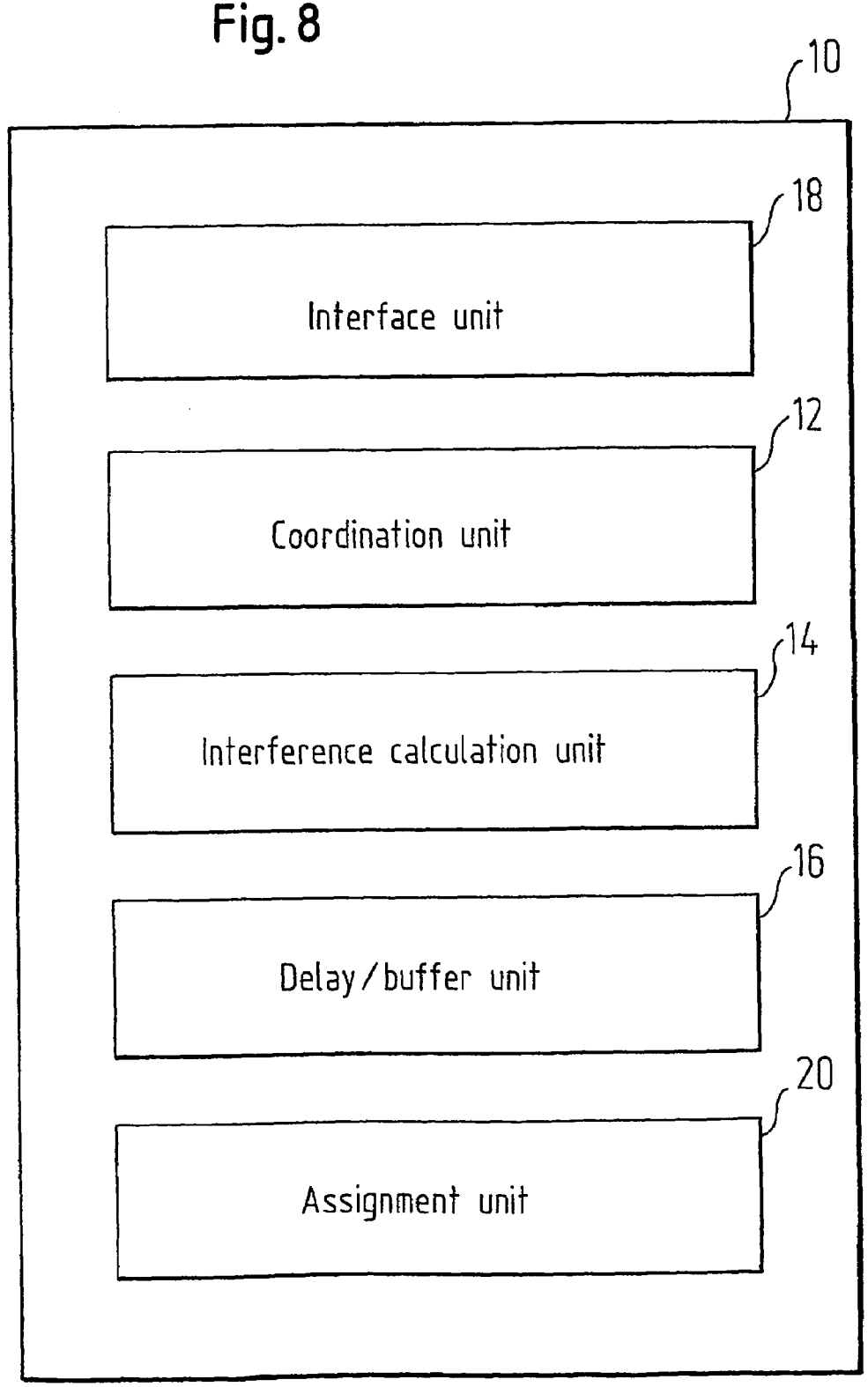
FIG. 8 shows a schematic diagram of an apparatus for scheduling a transfer of data according to the present invention.

FIG. 8 shows a schematic diagram of an apparatus 10 for scheduling a transfer of data as outlined so far.

As shown in FIG. 8, the apparatus 10 comprises a coordination unit 12 implementing the different scheduling strategies outlined above. Further, an interference calculation unit 14 allows to determine the interference level at each transmission time interval. A delay/buffer unit 16 serves to store data that may not be scheduled at a certain transmission time interval until the next transmission time interval.

Further, an interface unit 18 is provided for the exchange of control and user data within the cellular mobile communication network and an assignment unit 20 allows to modify the selection of codes for different users as outlined above. Here, it should be noted that the provision of the assignment unit 20 is only one preferred embodiment and that the related functionality may also be achieved through another network control node in the cellular mobile communication network and then be submitted to the apparatus 10 via the interface unit 18.

Figure 9:
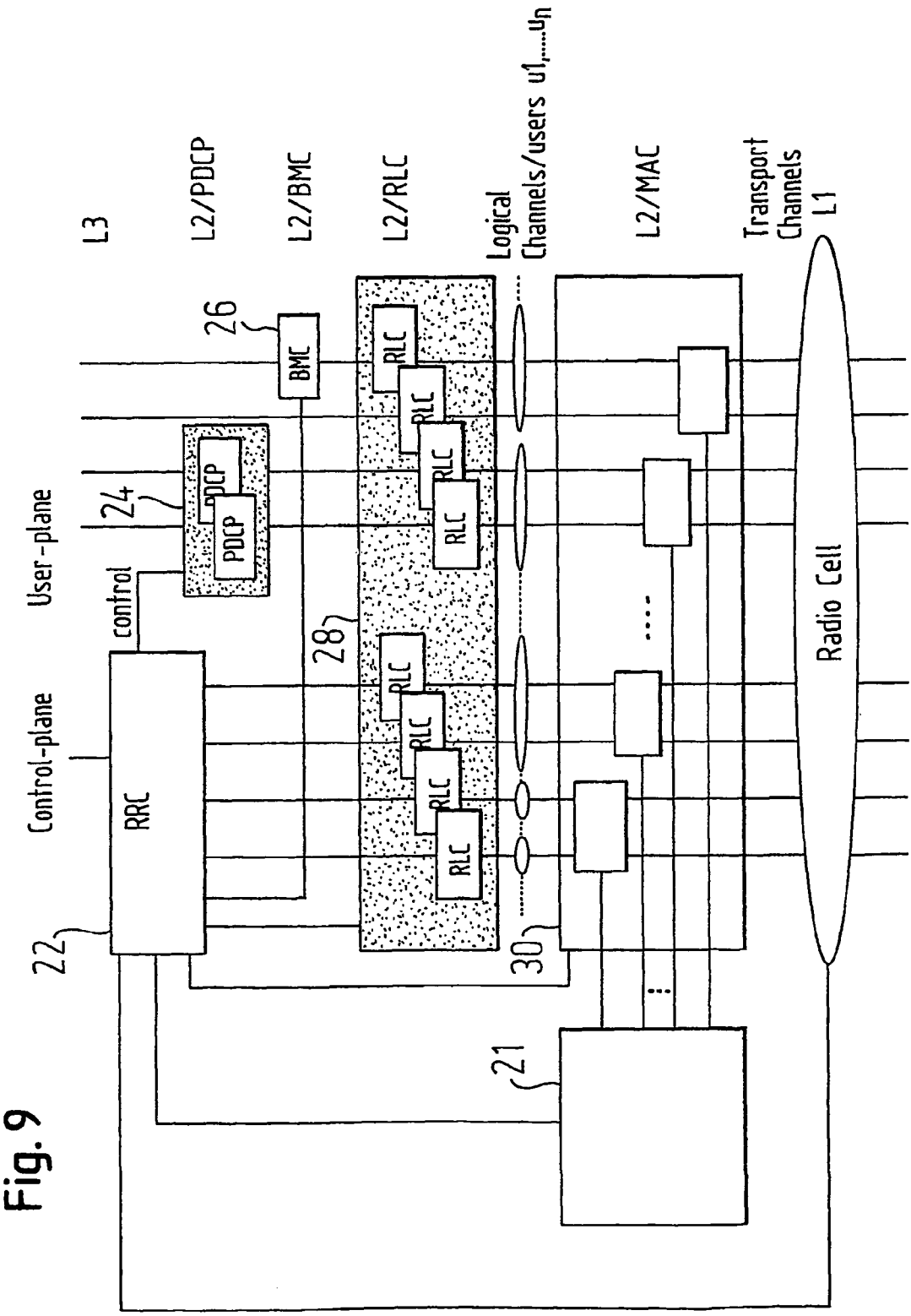
FIG. 9 shows the use of the apparatus for scheduling the transfer of data as shown in FIG. 8 within the protocol architecture of a CDMA radio network controller.

FIG. 9 shows the use of the apparatus shown in FIG. 8 within a CDMA cellular communication network as described, e.g., in 3G TS 25.301.

As shown in FIG. 9, the CDMA cellular communication network is operated using a plurality of layers, i.e. layer L3 as network layer, layer L2 as radio link layer, and layer L1 for the transport of data between user equipment and the CDMA cellular communication network.

On the network layer L3 a radio resource control protocol is operated to control the user equipment units implementing the lower layers L2 and L1. The packet data convergence protocol PDCP is provided for header compression and BMC entities 26 are adapted to handle broadcast and multicast messages sent to several users simultaneously.

As also shown in FIG. 9, the radio resource control protocol 22 uses a service access point SAP to control the radio link control protocol layer 28 comprising a plurality of radio link control protocol entities. In addition, the radio resource control protocol 22 controls a medium access controller 30 comprising a plurality of MAC entities for scheduling of data transfer from the radio link control protocol 28 to transport channels on the layer L1. Also layer L1 is operated under control of the radio resource control protocol 22.

As also shown in FIG. 9, it is the provision of the apparatus 21 for coordination of the scheduling activities of the MAC units of the medium access controller 30 that allows to limit the interference when using a plurality of channelization codes selected from different code trees for data transfer. The apparatus 21 implements the functionality of the coordination unit 12, the interference calculation unit 14, and the interface unit 18 shown in FIG. 8.

For the embodiment shown in FIG. 9 it is assumed that the code assignment is implemented in the radio resource control protocol 22 (according to the assignment unit 20 shown in FIG. 8) and that the result of the code assignment is then forwarded to the apparatus 21 for use in the scheduling of different downlink data transfer requests.

Further, for each radio bearer shown in FIG. 9 there is provided a radio link control RLC protocol entity in the radio link controller 28 (according to the delay/buffer unit 16 shown in FIG. 8) that terminates the radio link control protocol. Also, for each user there is provided a MAC unit in the medium access controller 30 for scheduling between the radio bearers used by the user.

It is the apparatus 21 coordinating the scheduling by the MAC units in the medium access controller 30 that ensures the minimization of interference during downlink data transfer. For the example shown in FIG. 9 this is achieved for several users u1 to un that share the physical resources of the cell. The users have either one or more radio bearers established.

One option—which is not to be construed as restricting the scope of the present invention—of performing the scheduling is to choose the transport format combination identifier TFCI on the MAC layer L2 in the radio network controller RNC of the UMTS terrestrial radio access network UTRAN. The selection of the transport format combination identifier TFCI is achieved via the coordination unit 12 of the apparatus 10 shown in FIG. 8.

As already outlined above, the preferred embodiment shown in FIG. 9—which is, e.g., well adapted to mobile Internet access—may be applied in an area selective manner at hotspot areas. For these applications the CDMA cellular mobile communication network with the protocol architecture shown in FIG. 9 may be provided to allow high speed data access, e.g., for the Internet. In other words, the CDMA system is not provided to cover the complete service area of a network operator but only at hotspot areas where a high data transfer traffic may be expected.

Another option is to provide a hybrid CDMA system together with another already existing cellular mobile communication system, e.g., GSM used to support real time voice connections. Here, the CDMA cellular mobile communication network is used to support data transfer while the GSM cellular mobile communication system would support voice traffic.

While in the above, the present invention has been described with reference to schematic diagrams of preferred embodiments of the inventive scheduling apparatus and method, it should be noted that clearly the present invention may also be implemented using the method of scheduling according to the present invention in a digital way using a micropocessor. In this case, the present invention may be embodied as a computer program product directly loadable into the internal memory of the microprocessor comprising software code portions for implementing the inventive method.

Further, it is understood that other modifications will be apparent to and can be readily made by those skilled in the art without departing from the scope and spirit of the present invention. Accordingly, it is not intended that the scope of claims appended hereto be limited to the description as set forth herein, but rather that the claims should be construed so as encompassing all features of patentable novelty that preside in the present invention, including all features that would be treated as equivalent thereof by those skilled in the art to which the present invention pertains.

The invention claimed is:

1. Method of scheduling a transfer of data to at least one user in a cellular mobile communication network, wherein the transfer of data is achieved via different downlink channels using codes selected from different code trees, the method comprising the steps:
   receiving requests to access downlink channels until the beginning of a scheduling time interval (TTI)
   coordinating permissions to access downlink channels according to the assignment of downlink channels to the different code trees.

2. A method according to claim 1, wherein access permissions to downlink channels are coordinated such that an interference is minimized.

3. A method according to claim 1 wherein the scheduling of access permissions is interrupted when a maximum interference level is exceeded.

4. A method according to claim 2, wherein requests for assignment of codes to downlink channels or requests for scheduling of access permissions are classified into different categories selected from a group comprising mandatory request, priority request, and normal request and that the assignment of codes to downlink channels or scheduling of access permissions is based on an order mandatory request, priority request, and normal request.

5. A method according to claim 1, further comprising assigning codes to downlink channels such that a code is preferably selected for assignment to a downlink channel from a code tree with maximum code tree utilization.

6. A method according to claim 1, further comprising assigning codes to downlink channels such that a code is preferably selected for assignment to a downlink channel from a code tree with minimum code tree utilization.

7. A method according to claim 1, further comprising assigning codes to downlink channels such that a code is preferably selected for assignment to a downlink channel from different code trees and that the access to the downlink channels is permitted in an alternating manner according to the code trees.

8. A computer program product on a storage medium or directly loadable into the internal memory of a radio access unit (MAC) in a mobile communication network comprising software code portions for performing the steps according to claims 1 when the product is run on a processor of the radio access unit (MAC).

9. An apparatus for scheduling a transfer of data to at least one user (A, B, C) in a cellular mobile communication network, wherein the transfer of data is achieved via different downlink channels using codes selected from different code trees, comprising:
   an interface unit adapted to receive requests to access downlink channels until the beginning of a scheduling time interval (TTI);
   a coordination unit adapted to coordinate permissions to access downlink channels according to the assignment of downlink channels to different code trees.

10. The apparatus according to claim 9, wherein the coordination unit is adapted to coordinate access permissions to downlink channels such that interference is minimized.

11. The apparatus according to claim 10, further comprising an interference calculation unit adapted to determine the interference between accessed downlink channels.

12. The apparatus according to claim 9, wherein the coordination unit is adapted to handle requests for scheduling of access permissions according to a classification into different categories selected from a group comprising mandatory request, priority request, and normal request and is further adapted to schedule access permissions according to an order mandatory request, priority request, and normal request.

13. A radio network control apparatus, comprising:
   an apparatus for scheduling a transfer of data to at least one user in a cellular mobile communication network according to claim 9;
   a code assignment unit adapted to assign codes to downlink channels on admission request.

14. The apparatus according to claim 13, wherein the code assignment unit is adapted to handle requests for assignment of codes to downlink channels according to a classification into different categories selected from a group comprising mandatory request, priority request, and normal request and is further adapted to assign downlink channels according to an order mandatory request, priority request, and normal request.

15. The apparatus according to claim 13, wherein the code assignment unit is adapted to preferably select codes for assignment from a code tree with maximum code tree utilization.

16. The apparatus according to claim 13, wherein the code assignment unit is adapted to preferably select codes for assignment from a code tree with minimum code tree utilization.

17. The apparatus according to claim 13, wherein the code assignment unit is adapted to preferably select codes for assignment to dowrilink channels from different code trees and that the coordination unit is adapted to permit the access to downlink channels is an alternating manner according to the code trees.

18. The apparatus according to claim 13, wherein the downlink channels are of the CDMA type.

19. The apparatus according to claim 13, wherein the downlink channels are of the overlay type.

20. A method of scheduling a transfer of data to at least one user in a cellular mobile communication network, wherein the transfer of data is achieved via different downlink channels using codes selected from different code trees, the method comprising the steps:
   receiving requests to access downlink channels until the beginning of a scheduling time interval (TTI);
   scheduling access to the downlink channels by using assignment of codes from different code trees to the downlink channels.

* * * * *